(12) United States Patent
Leyden et al.

(10) Patent No.: US 6,371,345 B1
(45) Date of Patent: Apr. 16, 2002

(54) ADJUSTABLE MOUNTING DEVICE

(75) Inventors: Matthew V. Leyden, St. Paul, MN (US); Kelly Kinnunen, Hancock, MI (US); Patrick J. Knight, Eagan, MN (US)

(73) Assignee: Pro-Fit International, Inc., Eagan, MN (US)

( * ) Notice: Subject to any disclaimer, the term of this patent is extended or adjusted under 35 U.S.C. 154(b) by 0 days.

(21) Appl. No.: 09/603,503

(22) Filed: Jun. 26, 2000

(51) Int. Cl.[7] .................................................. B60R 7/04
(52) U.S. Cl. .................... 224/553; 224/929; 248/288.51
(58) Field of Search ................................ 224/553, 547, 224/929; 248/181.1, 181.2, 288.31, 288.51; 403/56, 90, 122, 128, 130, 131, 132

(56) References Cited

U.S. PATENT DOCUMENTS

| | | |
|---|---|---|
| 501,510 A | 7/1893 | Hopkins et al. |
| 1,812,614 A | 6/1931 | Viken |
| 1,883,796 A | 10/1932 | King |
| 2,465,751 A | 3/1949 | Robins ........................ 248/289 |
| 2,861,501 A * | 11/1958 | Strelakos |
| 2,922,609 A | 1/1960 | Collier ........................ 248/179 |
| 4,067,532 A | 1/1978 | Viteretto ..................... 248/359 |
| 4,068,961 A | 1/1978 | Ebner et al. .................. 403/55 |
| 4,483,503 A | 11/1984 | Gahan ......................... 248/349 |
| 4,560,831 A | 12/1985 | Bast et al. .................... 179/2 E |
| 4,562,988 A | 1/1986 | Bumgardner ............... 248/349 |
| 4,564,166 A | 1/1986 | Craft et al. .................. 248/349 |
| 4,566,663 A | 1/1986 | Barchus ....................... 248/324 |
| 4,617,430 A | 10/1986 | Bryant ........................ 179/146 |
| 4,659,053 A | 4/1987 | Holey et al. ................. 248/663 |
| 4,836,485 A | 6/1989 | Cooper ........................ 248/278 |
| 4,840,485 A | 6/1989 | Gratton ....................... 356/317 |
| 4,877,164 A * | 10/1989 | Baucom |
| 4,974,802 A * | 12/1990 | Hendren |
| 4,986,503 A | 1/1991 | Kabat .......................... 248/181 |
| 5,031,865 A * | 7/1991 | Blattner |
| 5,040,712 A | 8/1991 | Pesonen et al. ........... 224/42.45 |
| 5,054,011 A * | 10/1991 | Alves |
| 5,072,907 A * | 12/1991 | Vogt |
| 5,086,485 A | 2/1992 | Lin .............................. 382/51 |
| 5,086,958 A * | 2/1992 | Nagy |
| 5,119,203 A | 6/1992 | Hosaka et al. ............... 358/229 |
| 5,187,744 A * | 2/1993 | Richter |
| 5,195,707 A | 3/1993 | Ignatuk et al. .............. 248/179 |
| 5,285,938 A | 2/1994 | Fauchald ............. 224/42.45 R |
| 5,392,350 A | 2/1995 | Swanson ..................... 379/446 |
| 5,419,522 A * | 5/1995 | Luecke et al. |
| 5,529,271 A * | 6/1996 | Dunchock |
| 5,664,750 A * | 9/1997 | Cohen |
| 5,738,322 A | 4/1998 | Huang ...................... 248/278.1 |
| 5,790,661 A | 8/1998 | Patterson ................... 379/446 |
| 5,799,914 A | 9/1998 | Chivallier et al. ........ 248/176.1 |
| 5,832,840 A | 11/1998 | Woof ............................. 108/6 |
| 5,845,885 A | 12/1998 | Carnevali ................. 248/118.1 |

* cited by examiner

*Primary Examiner*—Gregory M. Vidovich
(74) *Attorney, Agent, or Firm*—Brian D. Kaul; Westman, Champlin & Kelly

(57) ABSTRACT

An adjustable mounting device is provided for mounting an object at a selected position relative to a surface. The adjustable mounting device can be easily adjusted with one hand and generally includes a ball member, a stem portion attached to the ball member, a locking member, and first and second mounting portions coupled to the stem portion and the locking member, respectively. The locking member includes a ball retention member and a plunger member. The ball retention member includes first and second ball retention arms that are adapted to slidably engage the exterior surface of the ball member to form a pivotable connection. The plunger member includes a ball contact surface and is extendable between an adjustable position where the ball contact surface slidably engages the exterior surface of the ball member and a locking position where frictional resistance between the ball contact surface and the exterior surface of the ball member fix the position of the locking member relative to the ball member and stem portion.

18 Claims, 7 Drawing Sheets

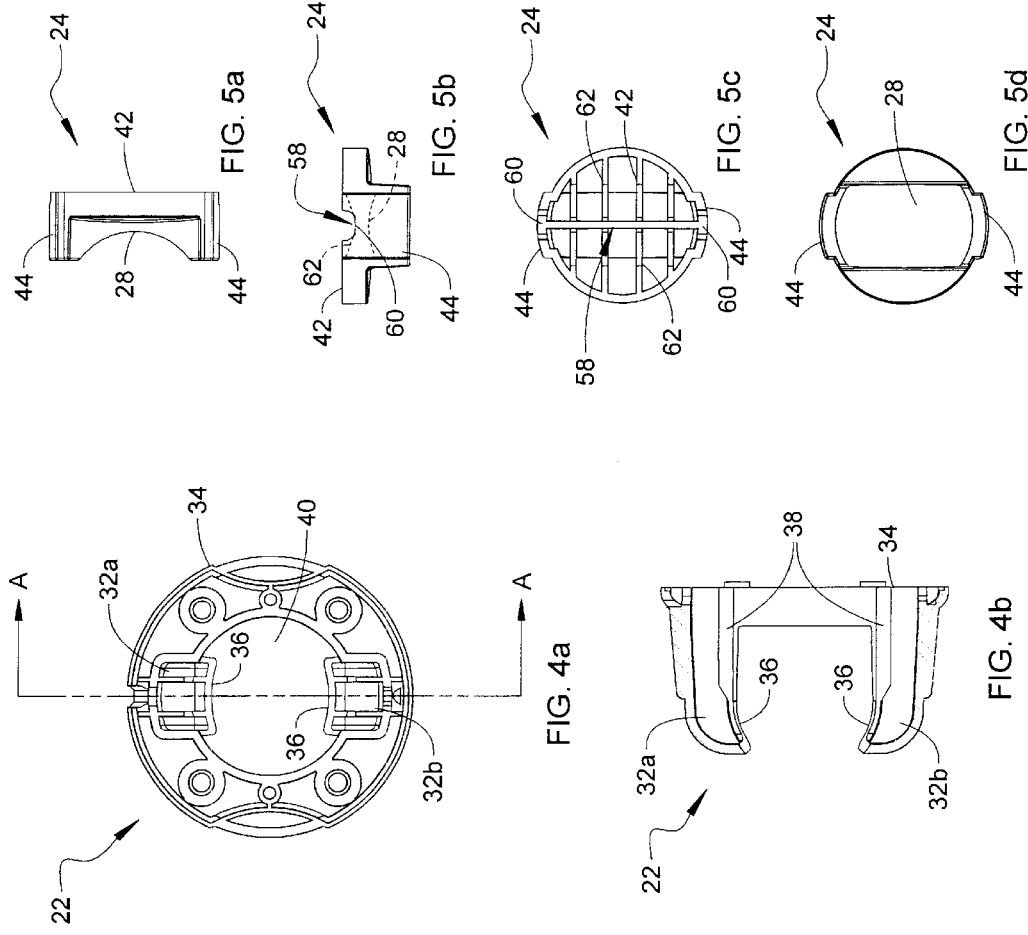

us 6,371,345 B1

ADJUSTABLE MOUNTING DEVICE

BACKGROUND OF THE INVENTION

The present invention relates to a mounting device, and more particularly to a highly adjustable mounting device capable of coupling two objects together or mounting an object to a surface.

Portable electronic devices, such as portable phones, personal data assistants (PDA), global positioning satellite (GPS) devices, CD players, and MP3 players, are becoming increasingly popular and are commonly used in automobiles and other vehicles. To ensure easy access to the device and to prevent the device from moving, it is desirable to mount the device to an interior surface of the vehicle. Due to the limited mounting space that is available in most vehicles, the mounting device should be capable of mounting to a non-flat surface of the vehicle. However, it is desirable that such mounting be accomplished without the use of fasteners that can damage the surface, such as screws.

Additionally, it is important that the device be highly adjustable. This is due, in part, to the limited mounting space that is available in most vehicles. Also, it is desirable to be able to orient the electronic device such that the user can conveniently access and operate the device.

Furthermore, adjustment of the mounting device should be as convenient as possible. Unfortunately, many currently known mounting devices cannot be conveniently adjusted. For example, many mounting devices require the loosening of a nut and bolt or similar fastener to adjust the tension between an extension arm, to which the electronic device is mounted, and a swivel post, which is attached to a surface of the vehicle. Once the nut and bolt fastener are loosened, the position of the electronic device can be changed. Finally, the user must tighten the nut and bolt fastener to fix the position of the electronic device. These types of mounting devices typically require two hands to adjust: one hand to hold the extension arm/electronic device and one to adjust the fastener that controls the tension between the extension arm and the swivel post. Furthermore, sometimes tools are required to adjust the fastener. Examples of such mounting devices are found in U.S. Pat. No. 4,840,485 to Cooper and U.S. Pat. No. 5,845,885 to Carnevali. Consequently, it would not be safe to adjust these types of mounting devices while operating a vehicle.

As a result, there is an on-going need for a highly adjustable mounting device that can mount an object, such as a portable electronic device, to a non-flat surface without causing damage to the surface, and can be conveniently adjusted to change the position of the object relative to the surface.

SUMMARY OF THE INVENTION

An adjustable mounting device is provided for mounting an object at a selected position relative to a surface. The adjustable mounting device can be easily adjusted with one hand and generally includes a ball member, a stem portion attached to the ball member, a locking member, and first and second mounting portions coupled to the stem portion and the locking member, respectively. The locking member includes a ball retention member and a plunger member. The ball retention member includes first and second ball retention arms that are adapted to slidably engage the exterior surface of the ball member to form a pivotable connection. The plunger member includes a ball contact surface and is extendable between an adjustable position where the ball contact surface slidably engages the exterior surface of the ball member and a locking position where frictional resistance between the ball contact surface and the exterior surface of the ball member fix the position of the locking member relative to the ball member and stem portion.

BRIEF DESCRIPTION OF THE DRAWINGS

FIG. 4a is a front plan view of a ball restriction member, in accordance with one embodiment of the invention.

FIG. 4b is a side cross-sectional view of a ball restriction member taken along line A—A of FIG. 4a.

FIGS. 5a and 5b are side plan views of a plunger member, in accordance with one embodiment of the invention.

FIGS. 5c and 5d are top and bottom views, respectively, of a plunger member, in accordance with one embodiment of the invention.

FIG. 6 is a side plan view of a cam lever, in accordance with various embodiments of the invention.

DETAILED DESCRIPTION OF THE PREFERRED EMBODIMENTS

Figure 1:
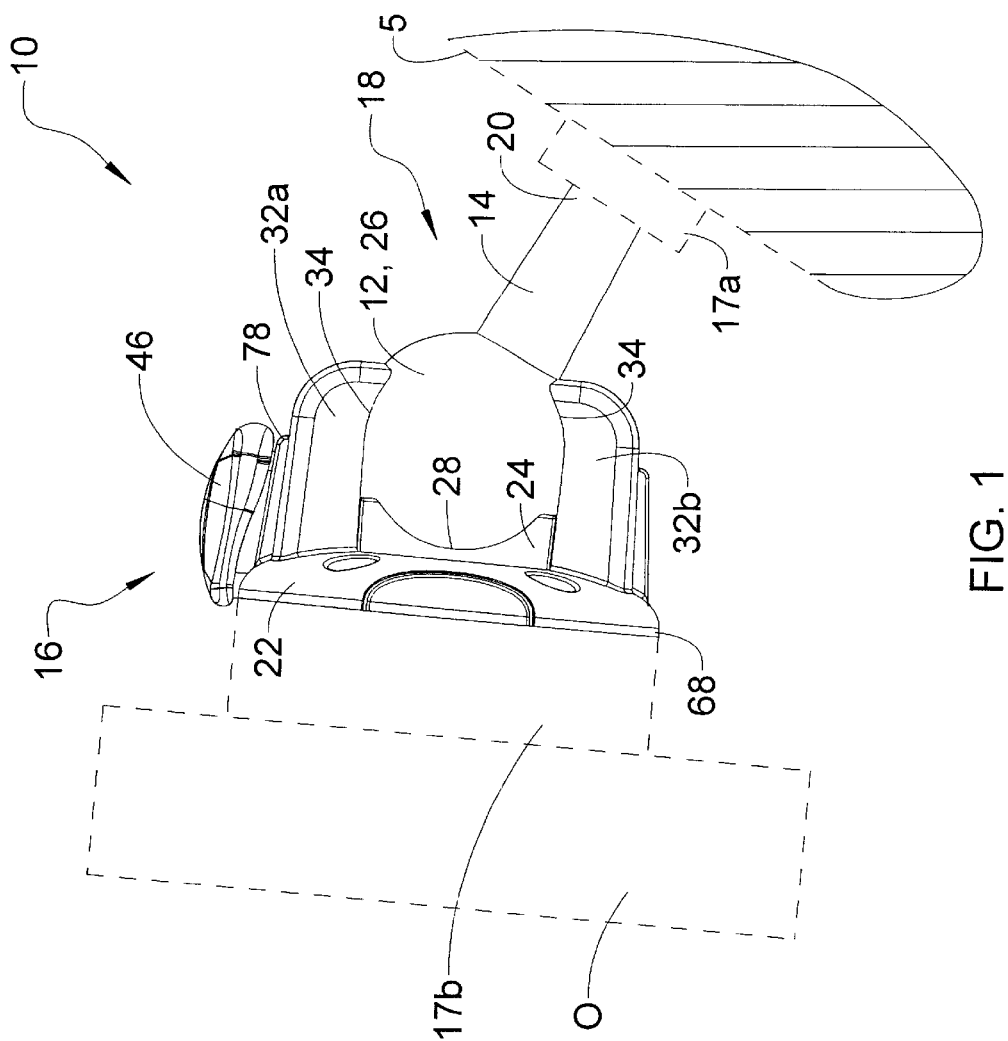
FIG. 1 is a side plan view of an adjustable mounting device coupled to an object and surface, in accordance with one embodiment of the invention.
Figure 2:
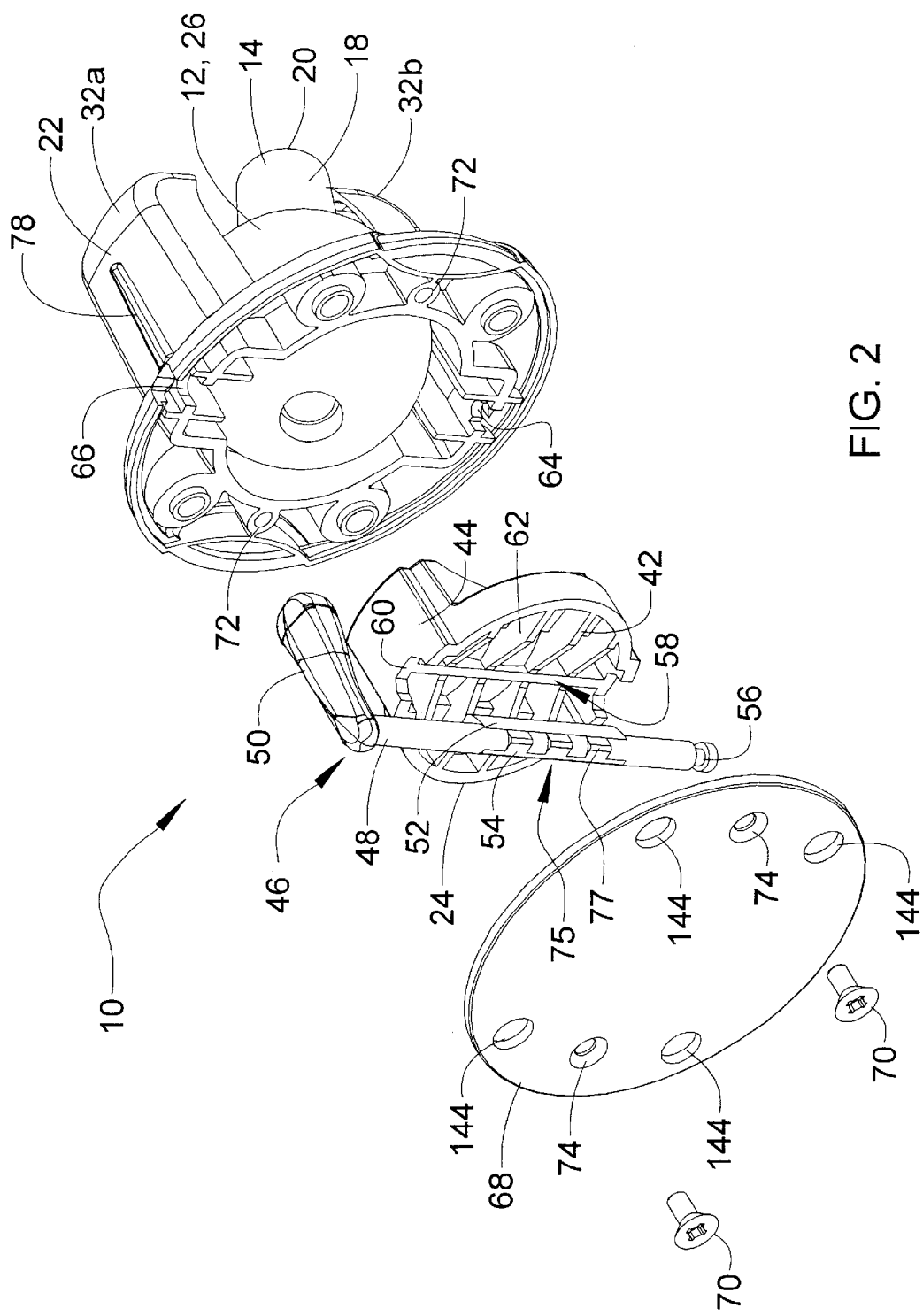
FIG. 2, is an exploded perspective view of an adjustable mounting device without first and second mounting portions, in accordance with one embodiment of the invention.

FIGS. 1 and 2 show an adjustable mounting device, generally designated as 10, which is capable of mounting an object at a selected position relative to a surface. FIG. 1 shows a side view of an assembled adjustable mounting device 10 which is coupled to a surface S and an object O and FIG. 2 shows an exploded perspective view of adjustable mounting device 10. Adjustable mounting device 10 generally includes ball member 12, stem portion 14, and locking member 16. Ball member 12 is attached to stem portion 14 to form ball/stem assembly 18. These components of adjustable mounting device 10 are preferably injection molded using a suitable thermoplastic, such as PTFE.

Locking member 16 and ball/stem assembly 18 form a pivotable connection such that the relative positions of locking member 16 and ball/stem assembly 18 can be adjusted. Locking member 16 can fix the relative positions of ball/stem assembly 18 and locking member 16 once in the desired position. Mounting portions 17a and 17b can respectively couple end 20 of stem portion 14 and locking member 16 to an object or a surface. In the example shown in FIG. 1, mounting portion 17a couples ball/stem assembly 18 to surface S and mounting portion 17b couples locking member 16 to object O. As a result, the relative positions of object O and surface S can be adjusted and fixed into position by adjustable mounting device 10.

Locking member 16 generally includes ball retention member 22 and plunger member 24. Ball retention member 22 is configured to retain ball member 12 while allowing ball/stem assembly 18 to freely pivot by slidably engaging exterior surface 26 of ball member 12. Plunger member 24 includes ball contact surface 28 and is extendable between an adjustable position (not shown) and a locking position (FIG. 1). When plunger member 24 is in the adjustable position, ball/stem assembly 18 can freely pivot within locking member 16. When plunger member 24 is in the locking position, frictional resistance between ball contact surface 28 and exterior surface 26 of ball member 12 resists the pivoting of ball/stem assembly 18, thereby fixing the relative positions of locking member 16 and ball/stem assembly 18.

Figure 3:
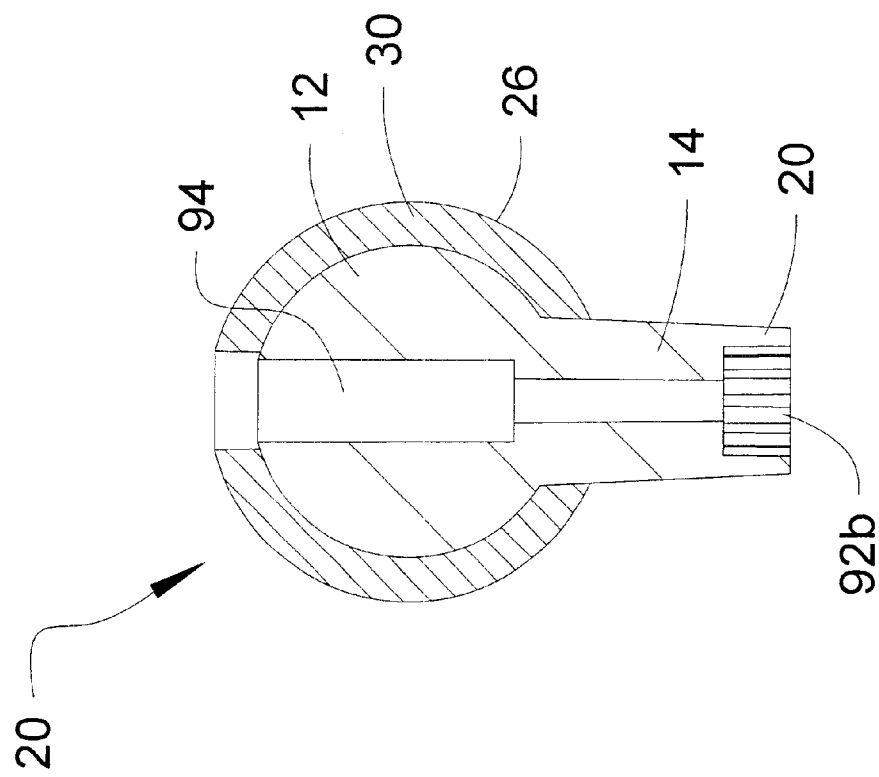
FIG. 3, is a cross-sectional view of a ball/stem assembly, in accordance with various embodiments of the invention.

Referring now to FIG. 3, a side cross-sectional view of ball/stem assembly 18, in accordance with one embodiment of the invention, is shown. Ball member 12 can include a compressible coating 30 which increases the frictional resistance between exterior surface 26 of ball member 12 and ball contact portion 28 of plunger member 24 when plunger 24 is in the locking position. As a result, coating 30 reduces the force that must be applied between ball contact surface 28 and exterior surface 26 of ball member 12 to fix the relative positions of object O and surface S. In addition, compressible coating 30 allows adjustable mounting device 10 to support heavier objects O than would be possible without coating 30. One embodiment of compressible coating 30 is formed by overmolding ball member 12 with a thermoplastic elastomer (TPE), such as Kraton® or Alcryn®, or other compressible material. In another embodiment, the frictional resistance between ball contact surface 28 of plunger member 24 and ball member 12 can be increased by coating ball contact surface 28 of plunger member 24 with a material having a higher coefficient of friction. As a result, embodiments of the present invention include coating ball member 12 and/or ball contact surface 28 of plunger member 24 with a material that increases the frictional resistance between ball contact surface 28 and exterior surface 26 of ball member 12 to increase the ability of adjustable mounting device 10 to fix the relative positions of an object 0 relative to a surface S.

With reference to FIGS. 4a–b, 5a–d, and 6, a discussion of various embodiments of locking member 16 will be provided. FIGS. 4a and 4b show one embodiment of ball retention member 22. FIG. 4a shows a front view of ball retention member 22 and FIG. 4b shows a side cross-sectional view of ball retention member 22 taken along line A—A of FIG. 4a. Ball retention member 22 includes first and second opposing ball retention arms 32a and 32b having positions that are fixed relative to each other via attachment to disc 34. First and second ball retention arms include ball engaging portions 36, which are configured to slidably engage and conform to exterior surface 26 of ball member 12, as shown in FIG. 1. Ball retention arms 32a, 32b further include plunger guides 38 which are configured to guide plunger member 24 between the adjustable and locking positions. Disc 34 includes opening 40 which is sized to allow for the insertion of ball/stem assembly 18 into locking member 16 such that ball member 12 is positioned between ball retention arms 32a and 32b, as shown in FIGS. 1 and 2. Ball retention member 22 limits the lateral motion of ball-stem assembly 18 in all directions except through opening 40. One advantage of ball retention member 22 is the wide range of angles through which ball/stem assembly 18 can pivot. The resulting pivotable connection between ball/stem assembly 18 and locking member 16 allows a user to adjust the position of object O as desired relative to surface S.

FIGS. 5a–5d show side views (FIGS. 5a and 5b), a top view (FIGS. 5c), and a bottom view (FIG. 5d) of plunger member 24 in accordance with one embodiment of the invention. Plunger member 24 includes back side 42 which is opposite ball contact surface 28. Ball contact surface 28 is generally a concave surface which conforms to exterior surface 26 of ball member 12. Plunger member 24 is inserted into opening 40 such that tabs 44 of plunger member 24 slidably engage plunger guides 38 of ball retention member 22, as indicated in FIG. 2. Tabs 44 cooperate with plunger guides 38 to guide plunger member 24 between the adjustable position and the locking position.

In one embodiment of the invention, locking member 16 includes cam lever 46, shown in FIG. 6. Cam lever 46 allows a user to easily actuate plunger member 24 between the adjustable and locking positions. Cam lever 46 directs the position of plunger member 24 to the adjustable position when cam lever 46 is in a first position (not shown) and directs plunger member 24 to the locking position when cam lever 46 is in a second position (shown in FIG. 1). One advantage to this embodiment of the invention, is that a user can conveniently operate the actuation of cam lever 46 using one hand. As a result, unlike many other mounting devices, a user can adjust the position of object O relative to surface S (FIG. 1) with one hand. This advantage becomes particularly useful when there is a need to make an adjustment of adjustable mounting device 10 while operating a vehicle.

Cam lever 46 generally includes rod 48, lever arm 50, cam 52, base 54, and groove 56. Cam lever 46 is configured to lay across plunger member 24 along channel 58 of plunger member 24 which extends between notches 60. Channel 58 is formed by ribs 62 which are tapered into back side 42 of plunger 24, as shown in FIGS. 2 and 5b. Cam lever 46 also lays across ball retention member 22 such that groove 56 rests on notch 64 and rod 48 rests in notch 66 of ball retention member 22. Plate 68, shown in FIG. 2, is used to maintain rod 48 of cam lever 46 within notches 64 and 66 of ball retention member 22 and cam 52 within channel 58. In addition, plate 68 maintains rod 48 within notches 60 of plunger member 24 when plunger member 24 is in the adjustable position. Plate 68 can attach to disc 34 of ball retention member 22 using screws 70 which engage threaded apertures 72 of ball retention member 22 through apertures 74 of plate 68.

Cam 52 of cam lever 46 engages ribs 62 within channel 58 and directs plunger member 24 into the adjustable position when cam lever 46 is in the first position and directs plunger member 24 into the locking position when cam lever 46 is in the second position. Base 54 of cam lever 46 serves two purposes: it prevents cam lever 46 from over-rotating past the second position and encourages (latches) cam lever 46 to remain in the second position. Base 54 is generally a flat surface formed on cam members 75 each having a beveled cam edge 77. Base 54 generally lies parallel to plate 68 when cam lever 46 is in the second position. Cam lever 46 is generally rotated between the first and second positions using lever arm 50. As rod 48 is rotated along the axis in a clockwise fashion (when viewed from the side of rod 48 to which lever arm 50 is attached) beveled cam edges 77 engage plate 68 thereby causing plate 68 to bow slightly just prior to reaching the second position in which base 54 lies parallel to plate 68. In one embodiment, lever arm 50 includes tab 76 which engages rib 78 of ball retention arm 32A to further resist the over-rotation of cam lever 46 beyond the second position, as shown in FIGS. 1, 2 and 6. Accordingly, cam members 75 of cam lever 46 operate as a latching mechanism to maintain cam lever 46 in the second position in accordance with conventional methods.

Figure 7:
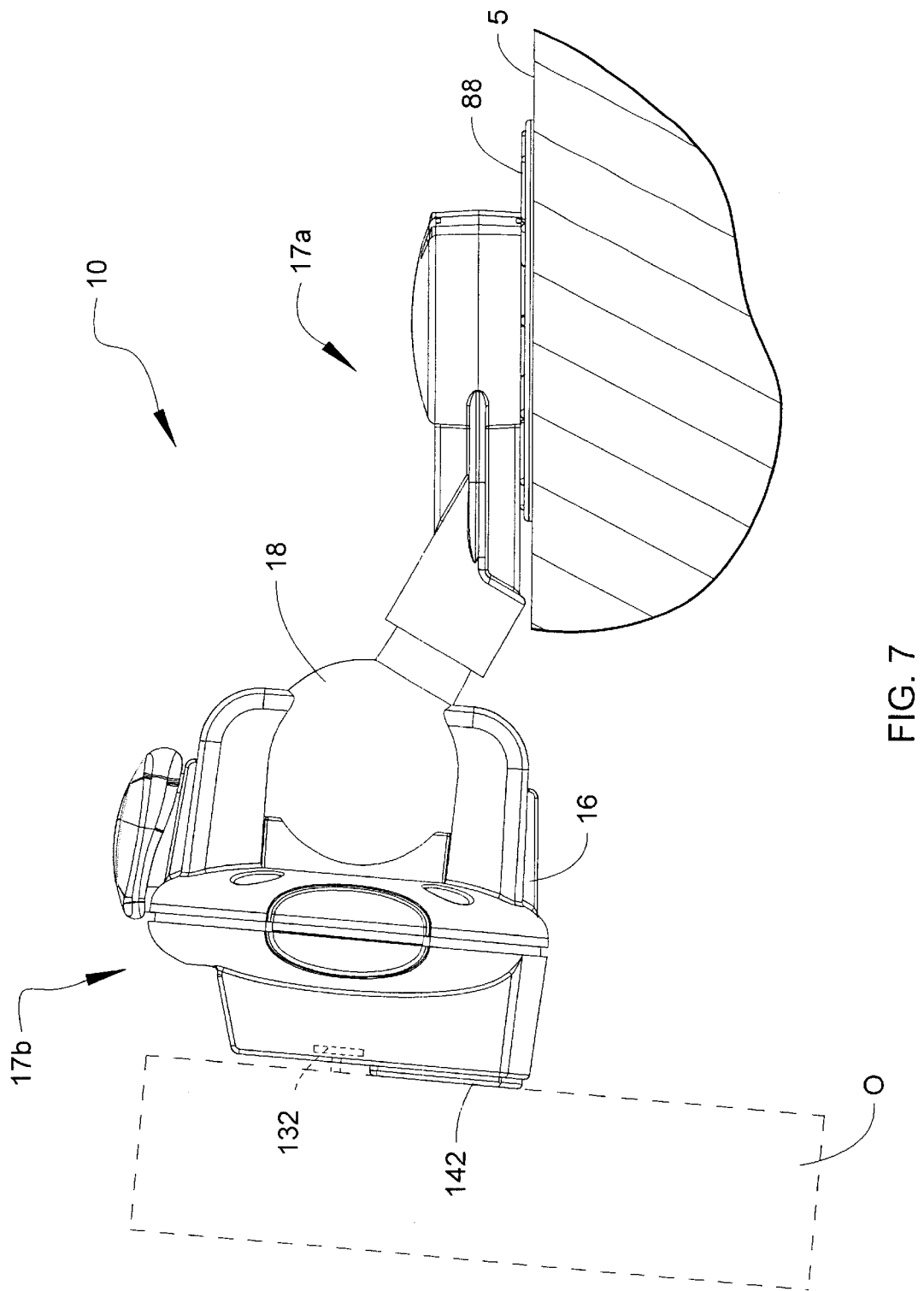
FIG. 7 shows an adjustable mounting device coupled to an object and a surface, in accordance with one embodiment of the invention.
Figure 8:
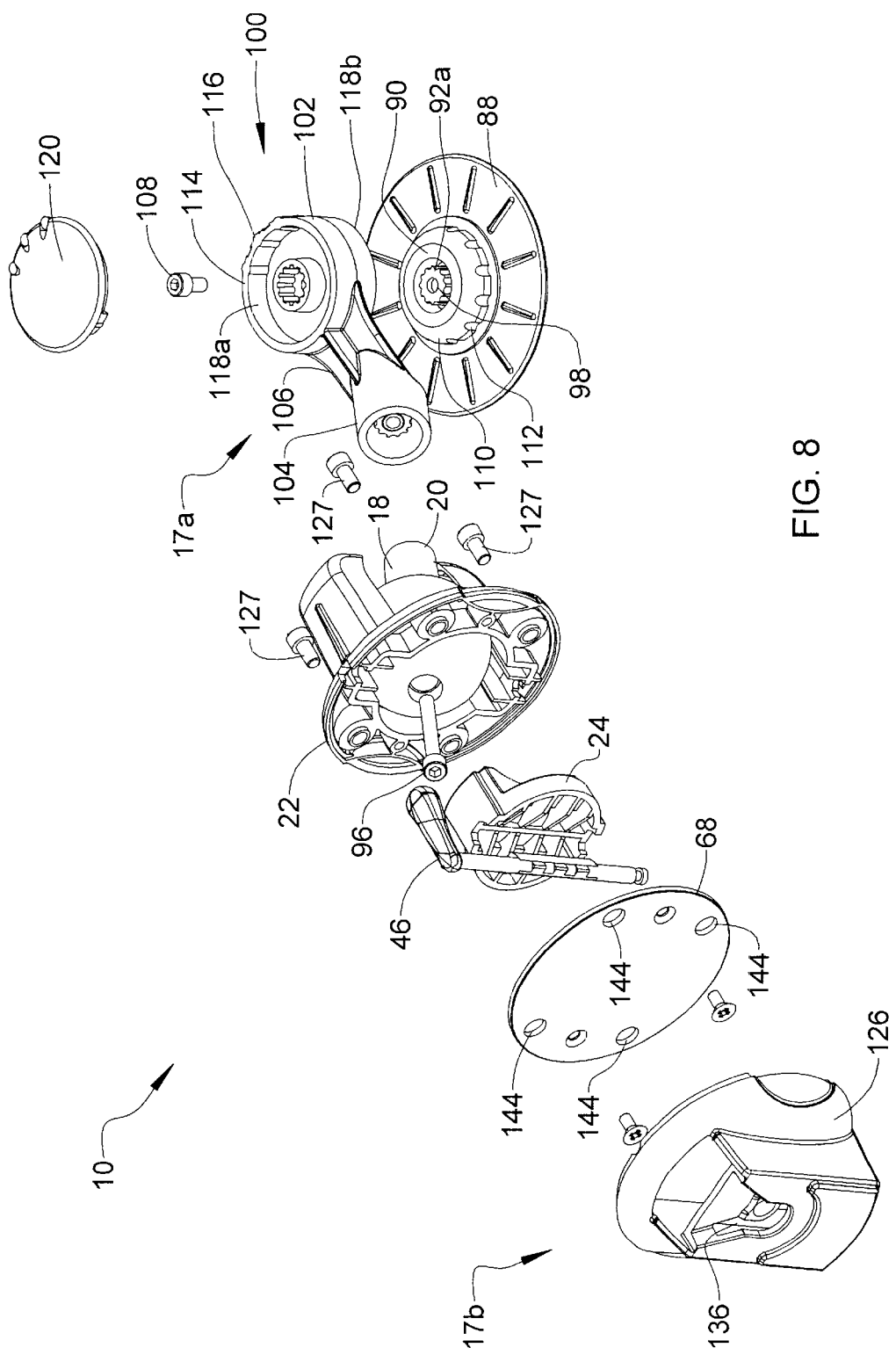
FIG. 8 is an exploded perspective view of an adjustable mounting device, in accordance with various embodiments of the invention.

Referring now to FIGS. 7 and 8, adjustable mounting device 10 can include first and second mounting portions 17a and 17b, which couple to stem portion 14 and locking member 16, respectively. First and second mounting portions 17a, 17b are generally configured to couple to either a surface S or an object O. Surface S can be a wall, an interior surface of a vehicle, a desk, or any other surface to which one desires to attach adjustable mounting device 10. Object O can be a portable electronic device such as a mobile phone, a personal data assistant (PDA), a global positioning satellite (GPS) device, a CD player, an MP3 player, a two-way radio, and many other portable electronic devices. The term mobile phone, as used herein, is intended to include hard-wired phones, cellular or PCS wireless phones, and other portable communication devices. Additionally, object O can be a book, a note pad, a mirror, a tool, a speaker, and any other object that adjustable mounting device 10 can reasonably support.

One embodiment of first mounting portion 17a that is configured to couple stem 14 of ball/stem assembly 18 to a surface S includes flexible pad 88 and connecting portion 90. Flexible pad 88 is adapted to conform and attach to surface S, even when surface S is a non-flat surface. Flexible pad 88 is preferably formed of a thermoplastic elastomer (TPE), such as Kraton® or Alcryn®. In one embodiment, flexible pad 88 attaches to surface S using an adhesive pad. One such suitable adhesive pad is the primerless 5568 adhesive pad manufactured by 3M.

Figure 9:
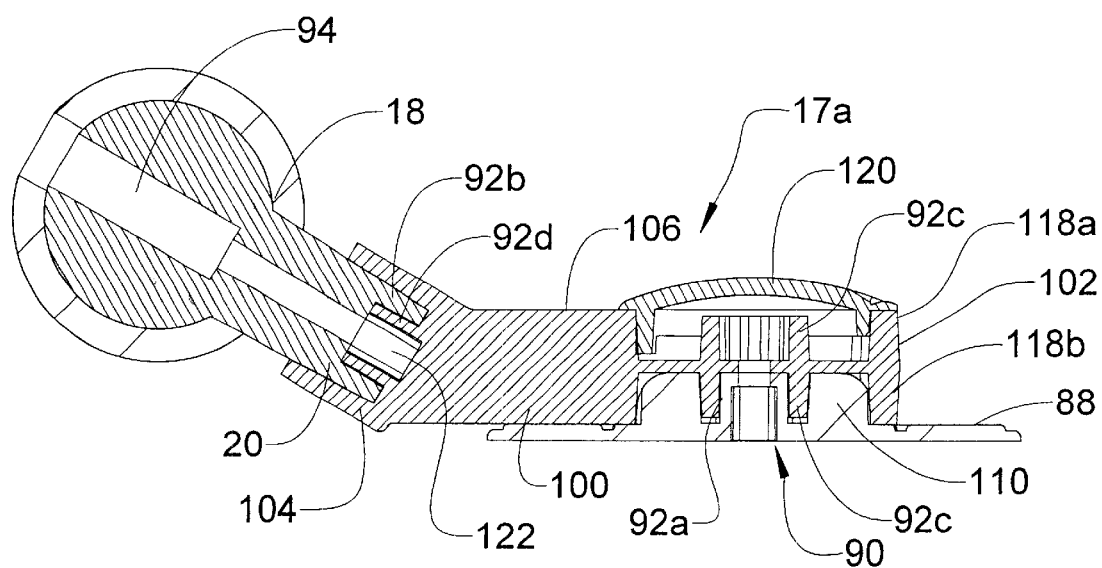
FIG. 9 is a side cross-sectional view of a ball/stem assembly coupled to a first mounting portion, in accordance with various embodiments of the invention.

One embodiment of connecting portion 90 is adapted to couple to end 20 of ball/stem assembly 18 using cooperating cylindrical grooved portions 92a (shown in FIG. 8) and 92b (shown in FIGS. 3 and 9). Cylindrical grooved portions 92a and 92b can interlock to fix the relative angular positions of ball/stem assembly 18 and first mounting portion 17a. Ball/stem assembly 18 can include bore 94, through which, screw 96 (FIG. 8) can couple to threaded aperture 98 of connecting portion 90 to secure ball/stem assembly 18 to first mounting portion 17a.

Another embodiment of first mounting portion 17a also includes extension arm 100, which extends between connecting portion 90 and ball/stem assembly 18. Extension arm 100 includes connecting portion 102, stem receptacle 104, and arm 106. Connecting portion 102 couples extension arm 100 to connecting portion 90. Stem receptacle 104 couples to end 20 of stem 14. Extension arm 106 extends between connecting portion 102 and stem receptacle 104.

One embodiment of connecting portion 102 includes cooperating cylindrical grooved portions 92c that can interlock with cylindrical grooved portion 92a of connecting portion 90 to fix their relative angular positions. Screw 108 can be used to secure the connection.

In another embodiment, connecting portion 90 includes cylindrical member 110 with recesses 112 and connecting portion 102 includes cooperating cylindrical portion 114 with protuberances 116. Here, cylindrical portion 114 can receive cylindrical member 110, such that protuberances 116 engage corresponding recesses 112 to prevent extension arm 100 from rotating relative to connecting portion 90. Again, screw 108 can be used to secure the connection. Also, cylindrical portion 114 can have symmetric top and bottom sides 118a and 118b, shown in FIG. 9, which allow connecting portion 102 of extension arm 100 to attach to connecting portion 90 using either side 118a or 118b. Cap 120 can be used to cover the exposed side 118a (FIG. 9) or 118b of cylindrical portion 114.

Stem receptacle 104 is configured to couple to end 20 of stem 14. In one embodiment, stem receptacle 104 receives end 20 of stem 14, as shown in FIG. 9. Here, stem receptacle 104 includes cylindrical grooved portion 92d that can interlock with cylindrical grooved portion 92b of end 20 to prevent stem 14 from rotating within stem receptacle 104. Cylindrical grooved portion 92d can include threaded aperture 122 that is configured to receive screw 96 (FIG. 8) through bore 94 (FIGS. 3 and 9) of ball/stem assembly 18 to secure ball/stem assembly 18 to extension arm 100.

Figure 10:
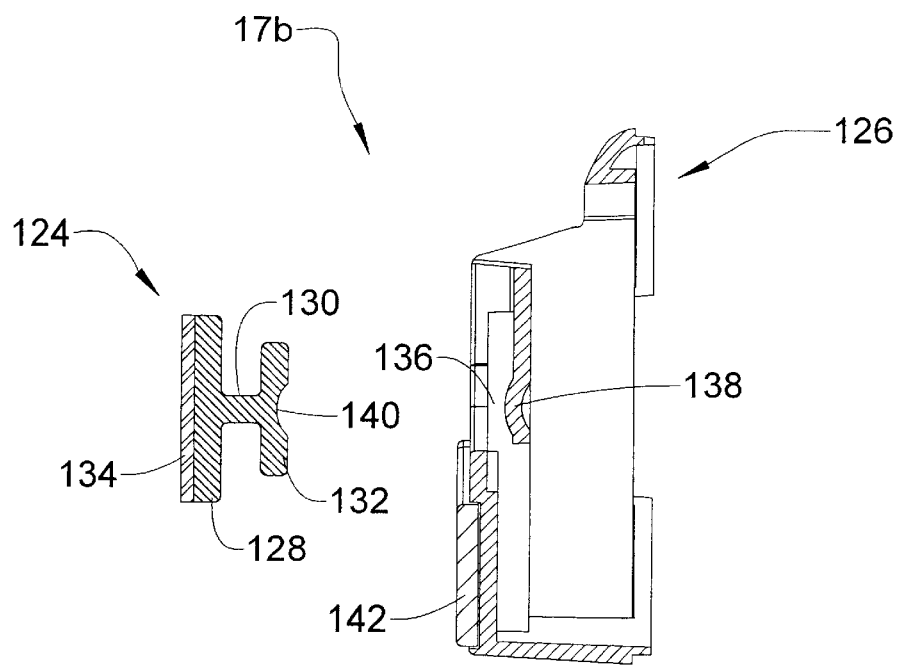
FIG. 10 is side cross-sectional view of components of a second mounting portion, in accordance with one embodiment of the invention.

One embodiment of second mounting portion 17b, shown in FIGS. 7, 8 and 10, is configured to mount an object to locking member 16. Second mounting portion 17b generally includes button portion 124 and button receptacle 126, as shown in FIG. 10. Button receptacle 126 couples to locking member 16 at plate 68 using screws 127 or other suitable fastener, as shown in FIG. 8. Button portion 124 includes a base portion 128, stem 130 and button 132. Base 136 can couple to an object O using adhesive pad 134 or other suitable fastener. Button receptacle 126 can receive button 132 at slot 136, shown best in FIG. 8. Button portion 124 can be firmly held within button receptacle 126 by flexible member 138, which preferably has a shape that conforms to detent 140 of button 132 to secure button 132 in place. In one embodiment, button receptacle 126 includes pad 142 which is adapted to aid in the securing of object O to second mounting portion 17b.

In another embodiment of the invention, plate 68 includes apertures 144 (FIG. 8) that are placed in an Advanced Mobile Phone Service (AMPS) compatible pattern. Here, plate 68 forms a second mounting platform to which can couple numerous AMPS-compatible objects.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, it should be understood that first and second mounting portions 17a and 17b could take on many different forms and still provide the desired function of coupling adjustable mounting device 10 to an object and a surface, two objects, or two surfaces.

What is claimed is:

1. An adjustable mounting device for mounting a portable electronic device at a selected position relative to an interior surface of a vehicle comprising:

a ball member having an exterior surface;

a stem portion attached to the ball member and having an end;

a locking member comprising:

a ball retention member including first and second opposing ball retention arms fixed in relation to each other and hating ball engaging portions which slidably engage and conform to the exterior surface of the ball member, thereby forming a pivotable connection; and a plunger member adjacent the first and second ball retention arms and having a ball contact surface and a position relative to the ball member and stem portion, the plunger member extendable between an adjustable position wherein the ball contact surface slidably engages the exterior surface of the ball member and a locking position wherein frictional resistance between the ball contact surface and the exterior surface of the ball member fix the position of the locking member relative to the ball member and stem portion; and first and second mounting portions coupled to the stem portion and the locking member, respectively, wherein one is couplable to the surface and the other is couplable to the portable electronic device; the mounting portion couplable to the surface includes:

a first connecting portion having a cylindrical grooved portion;

a flexible pad coupled to the first connecting portion and couplable to the surface; and an extension arm including a first end couplable to the first connecting portion and having a cylindrical grooved portion configured to cooperate with the cylindrical grooved portion of the first connecting portion to fix an angular position of the extension arm relative to the flexible pad, the arm further including a second end couplable to the end of the stem portion or the locking member.

2. The device of claim 1, wherein the locking member includes a cam lever rotatable between first and second positions, the cam lever having a cam surface that directs the position of the plunger member to the adjustable position when the cam lever is in the first position and to the locking position when the cam lever is in the second position.

3. The device of claim 1, wherein at least one of the exterior surface of the ball member and the ball contact surface of the plunger member include a compressible coating which increases the frictional resistance between the ball contact portion and the exterior surface of the ball member.

4. The device of claim 3, wherein the coating is a thermoplastic elastomer coating.

5. The device of claim 1, wherein the mounting portion couplable to the electronic device includes a plate having an AMPS-compatible hole pattern.

6. The device of claim 1, wherein the mounting portion couplable to the electronic device includes a button portion couplable to the portable electronic device and a button receptacle adapted to receive the button portion, whereby the portable electronic device can be demountably coupled to the button receptacle.

7. The device of claim 1, wherein the portable electronic device is selected from a group consisting of a mobile phone, a compact disk player, a global positioning satellite device, a two-way radio, and a personal data assistant.

8. The device of claim 1, wherein the surface is a non-flat surface and the flexible pad conforms to the surface.

9. The device of claim 1, wherein the locking member can be operated with one hand.

10. An adjustable mounting device for mounting a portable electronic device at a selected position relative to an interior surface of a vehicle comprising:

a ball member having an exterior surface;

a stem portion attached to the ball member and having a cylindrical grooved portion at an end;

a locking member comprising:

a ball retention member including first and second opposing ball retention arms fixed in relation to each other and having ball engaging portions which slidably engage and conform to the exterior surface of the ball member, thereby forming a pivotable connection; and a plunger member adjacent the first and second ball retention arms and having a ball contact surface and a position relative to the ball member and stem portion, the plunger member extendable between an adjustable position wherein the ball contact surface slidably engages the exterior surface of the ball member and a locking position wherein frictional resistance between the ball contact surface and the exterior surface of the ball member fix the position of the locking member relative to the ball member and stem portion;

first and second mounting portions coupled to the stem portion and the locking member, respectively, wherein the first mounting portion includes:

a first connecting portion;

a flexible pad coupled to the first connecting portion and couplable to the surface; and an extension arm having a first end couplable to the first connecting portion and a stem receptacle couplable to the end of the stem portion, wherein the stem receptacle includes a cylindrical grooved portion configured to cooperate with the cylindrical grooved portion of the stem to fix an angular position of the extension arm relative to the stem portion.

11. The device of claim 10, wherein the locking member includes a cam lever rotatable between first and second positions, the cam lever having a cam surface that directs the position of the plunger member to the adjustable position-when the cam lever is in the first position and to the locking position when the cam lever is in the second position.

12. The device of claim 10, wherein at least one of the exterior surface of the ball member and the ball contact surface of the plunger member include a compressible coating which increases the frictional resistance between the ball contact portion and the exterior surface of the ball member.

13. The device of claim 12, wherein the coating is a thermoplastic elastomer coating.

14. The device of claim 10, wherein the second mounting portion includes a plate having an AMPS-compatible hole pattern.

15. The device of claim 10, wherein the second mounting portions includes a button portion couplable to the portable electronic device and a button receptacle coupled to the locking member and adapted to receive the button portion, whereby the portable electronic device can be demountably coupled to the button receptacle.

16. The device of claim 10, wherein the portable electronic device is selected from a group consisting of a mobile phone, a compact disk player, a global positioning satellite device, a two-way radio, and a personal data assistant.

17. The device of claim 10, wherein the surface is a non-flat surface and the flexible pad conforms to the surface.

18. The device of claim 10, wherein the locking member can be operated with one hand.

* * * * *

UNITED STATES PATENT AND TRADEMARK OFFICE
CERTIFICATE OF CORRECTION

PATENT NO. : 6,371,345 B1
DATED : April 16, 2002
INVENTOR(S) : Matthew V. Leyden et al.

It is certified that error appears in the above-identified patent and that said Letters Patent is hereby corrected as shown below:

Column 6,
Line 62, cancel "hating" and insert -- having --

Signed and Sealed this

Seventh Day of January, 2003

JAMES E. ROGAN
*Director of the United States Patent and Trademark Office*